S. V. DICKMAN.
PLANETARY GEARING.
APPLICATION FILED AUG. 25, 1919.

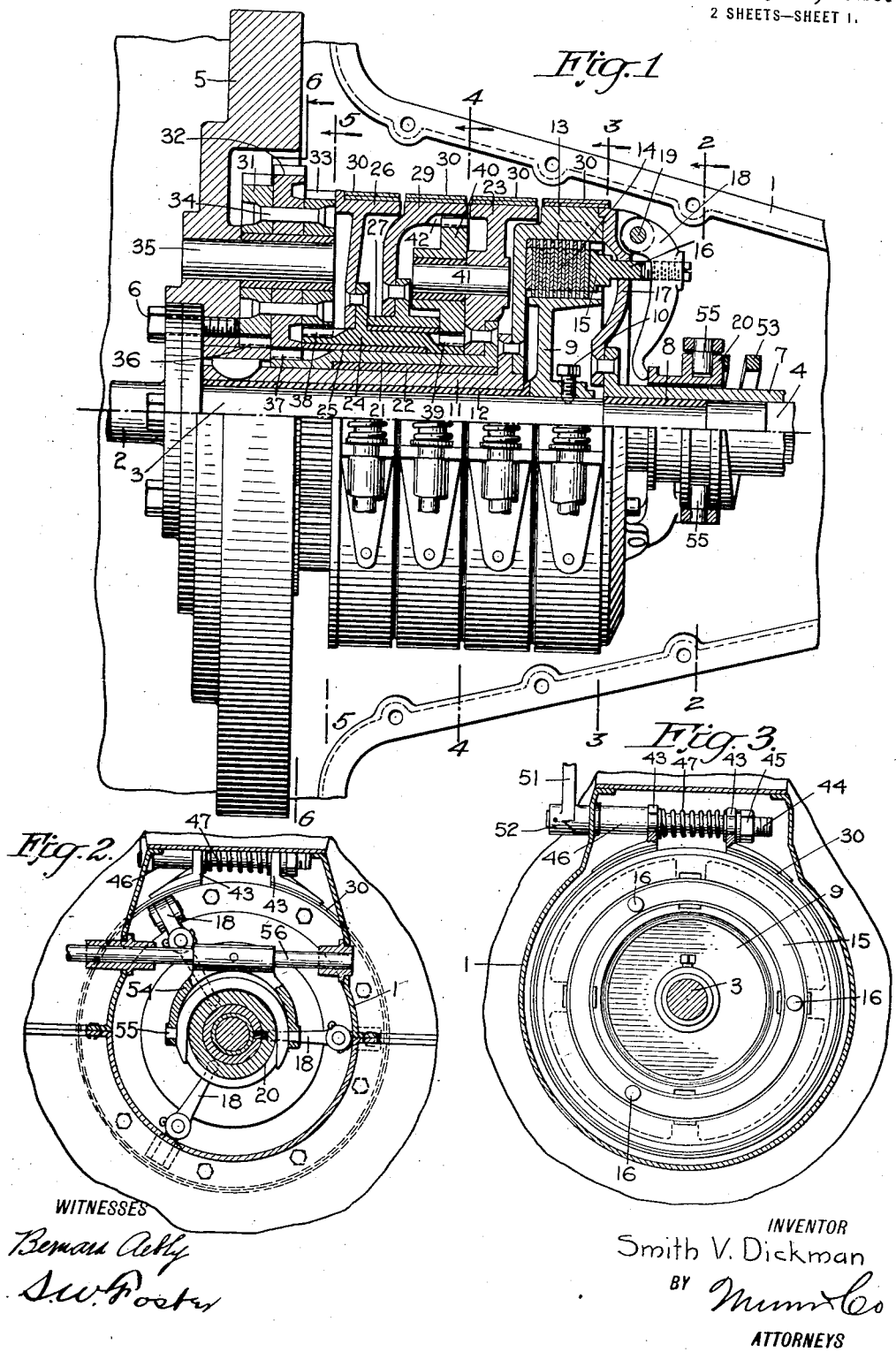

1,348,095.

Patented July 27, 1920.
2 SHEETS—SHEET 2.

WITNESSES
Bernard Ably
S.W. Foster

INVENTOR
Smith V. Dickman
BY Munn & Co.
ATTORNEYS

UNITED STATES PATENT OFFICE.

SMITH V. DICKMAN, OF SHAVERTOWN, NEW YORK.

PLANETARY GEARING.

1,348,095.  Specification of Letters Patent.  Patented July 27, 1920.

Application filed August 25, 1919. Serial No. 319,539.

*To all whom it may concern:*

Be it known that I, SMITH V. DICKMAN, a citizen of the United States, and a resident of Shavertown, in the county of Delaware and State of New York, have invented a new and Improved Planetary Gearing, of which the following is a full, clear, and exact description.

This invention relates to improvements in planetary gearing, an object of the invention being to provide improved means whereby three forward speeds and a reverse can be transmitted from the drive shaft to the driven shaft by the selective operation of brake bands controlling drums.

A further object is to provide improvements of the character stated which are compact in assemblage, comparatively simple in construction and strong and durable in use.

With these and other objects in view the invention consists in certain novel features of construction, and combinations and arrangements of parts, as will be more fully hereinafter described and pointed out in the claims.

In the accompanying drawings—

Figure 1 is a view partly in elevation and partly in section illustrating my improvements;

Fig. 2 is a view in transverse section on the line 2—2 of Fig. 1;

Fig. 3 is a view in transverse section on the line 3—3 of Fig. 1;

Figure 4:
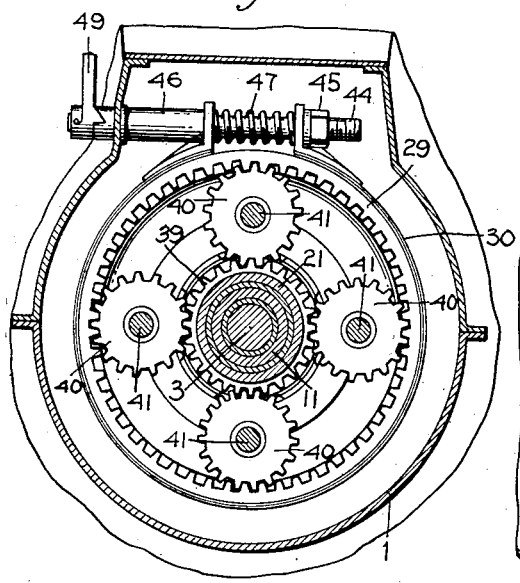
Fig. 4 is a view in transverse section on the line 4—4 of Fig. 1.
Figure 5:
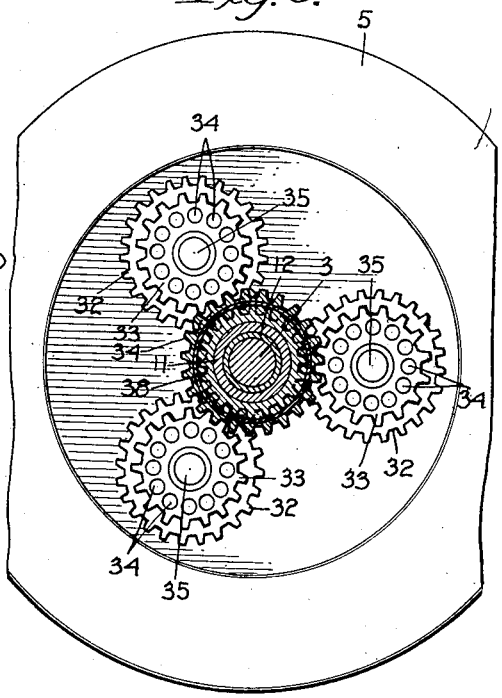
Fig. 5 is a view in transverse section on the line 5—5 of Fig. 1.
Figure 6:
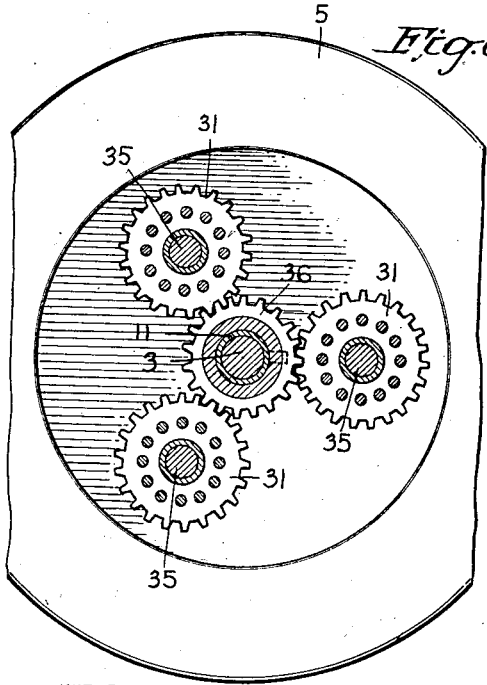
Fig. 6 is a view in transverse section on the line 6—6 of Fig. 1.

1 represents a suitable casing inclosing my improved gearing and 2 is a drive shaft having a gear supporting journal 3 in alinement therewith and also in alinement with a driven shaft 4. The journal 3 and drive shaft 2 are secured together and to a flywheel 5 by means of cap screws 6. A sleeve 7 is fixed to the driven shaft 4 and turns freely on a bushing 8 located around the end of journal 3. A disk 9 is secured to the journal 3 by means of screws 10 or other suitable connecting devices.

A sleeve 11 is mounted to turn on the journal 3 around a bushing 12 and has a drum 13 fixed thereto. The drum 13 and the disk 9 are provided with friction disks 14 which are pressed together by a ring 15 operated by plungers 16 to frictionally connect the drum 13 and disk 9.

The plungers 16 are movable through a ring 17 fixed to sleeve 7 and are operated by arms 18 pivotally connected to the ring 17, as shown at 19, and at their inner free ends are engaged by a sliding collar 20 keyed to the sleeve 7.

A sleeve 21 turns on the sleeve 11 and has an interposed bushing 22 between the same and the sleeve 11. This sleeve 21 carries a drum 23. Another sleeve 24 is mounted to turn on the sleeve 21 and has a bushing 25 between the same and the sleeve 21. This sleeve 24 has a drum 26 secured thereto.

A sleeve 27 is mounted to turn around the sleeve 24 and has a bushing 28. The sleeve 27 carries a drum 29 and all of the drums 26, 29, 23 and 13 are of substantially the same diameter and have brake bands 30 to engage the same, as will more fully hereinafter appear.

Three sets of driving pinions 31, 32 and 33 are secured together by rivets 34 and mounted to turn on journal pins 35 secured to the flywheel 5. These pinions 31, 32 and 33 are of different diameters. The pinions 31 mesh with a gear 36 carried by sleeve 11. The pinions 32 mesh with a gear 37 carried by sleeve 21. The pinions 33 mesh with a gear 38 carried by sleeve 24. The sleeve 24 also has a gear 39 which meshes with a series of pinions 40 having rotary mounting on journal pins 41 carried by the drum 23. These pinions 40 also mesh with an internal rack 42 in drum 29.

The friction bands 30 for all of the drums and the operating mechanism therefor being precisely alike, the description hereinafter of one will apply alike to all.

The bands 30 have perforated lugs 43 at their ends which receive a rod 44 having a nut 45 on one end and a sleeve 46 on their other ends. A coiled spring 47 is located around the rod 44 and bears against the lugs 43 tending to release the brake band. The operating levers 48, 49, 50 and 51 respectively of the brake drums 26, 29, 23 and 13 respectively have cam collars 52 which engage the ends of the sleeve 46 which are also shaped to be engaged by the cam collars so that the turning movement of the levers operates to move the rod 44 longitudinally causing the lugs 43 to be moved toward each other and the brake band contracted around the drum.

The sliding collar 20, above referred to, which operates the arms 18, is provided with a coiled spring 53 normally pressing the collar in one direction. A forked member 54 has pin and groove engagement 55 with collar 20 and is secured on a shaft 56 and has an operating lever 57 thereon which may be manually operated in any approved manner to move the sleeve 21 against the action of the spring 53.

Figure 7:
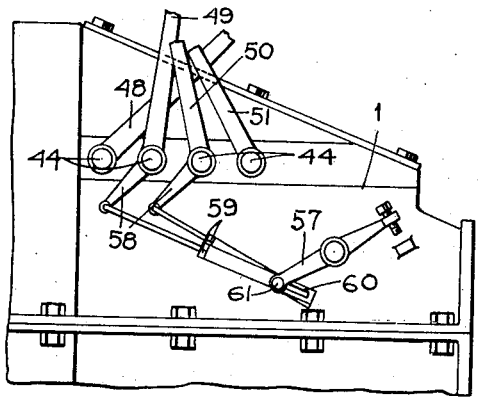
Fig. 7 is a view on a reduced scale in side elevation illustrating the operating levers for the several gear shifts.

By reference to Fig. 7, it will be noted that the levers 49 and 50 have crank arms 58 secured thereto and connected by links 59 with the lever 57. The links 59 have slots 60 therein receiving a pin 61 on lever 57 to permit of a certain independent movement of the levers 49 and 50, yet during a portion of the movement cause the lever 57 to operate as will be readily understood.

For all practical purposes the sleeve 11, drum 13, ring 17 and sleeve 7 constitute a single unit as motion is transmitted through these parts from the pinion 31 and gear 36, the speed of such turning movement being varied by the braking action on the several drums, as will now be pointed out.

When the gear is in high, the collar 20 is moved to the left of Fig. 1 causing the arms 18 to move the plungers 16 inwardly compelling the disks 14 to frictionally engage and bind the drum 13 with the disk 9 so that the speed of the journal 3 is directly communicated to the driven shaft 4. To reverse, the drum 26 is held by means of its brake band. This causes the triple pinions 31, 32 and 33 to be turned on pin 35, gear 38 being held by means of drum 26 and band 30, will cause pinions 33 to ride around 38, 38 having a larger diameter than part 33, part 33 will make more than one revolution on pin 35 while the flywheel makes one around its axis thus causing part 31 to drive part 36 in a direction opposite to that of the fly-wheel which in turn drives sleeve 11, drum 13, ring 17, sleeve 7 and driven shaft 4.

When the gear is in high, the disks 14 are frictionally held by means of collar 20 and arms 18 acted upon by spring 53.

When the gears are moved either to low, intermediate or reverse speeds, the disks 14 are released and this action is provided for by means of the connecting links 59, as shown in Fig. 7. To reverse, an arm operated by a hand lever (not shown in Fig. 7) lifts under set screw and end of arm 57 thus releasing the disks 14 and holding them released so that low, intermediate or reverse can be operated as selective transmission regardless of high.

When the gears are moved either to low or intermediate speeds, the disks 14 are released and this action is provided for by means of the connecting links 59, as shown in Fig. 7, so that when the clutch bands around the drums 29 or 23 are operated to hold the drums, the collar 20 will move far enough to release the binding action of the disks 14 against each other.

When the device is in low, the friction band around the drum 23 holds the drum 23. As the pinion 32 meshing with gear 37 on sleeve 21 is larger than the gear 31 and motion is transmitted from the gear 31 to the gear 36, the speed is thereby reduced and the engine will be operating in low.

When running in low, pinion 33 turns pinion 38 in the same manner as pinion 31 turns pinion 36 but, of course, at a slightly different speed. To obtain an intermediate speed instead of holding drum 23, sleeve 21 and gear 37 stationary, said drum 23 must be driven in the same direction as that of the flywheel but at a slower rate of speed. This is done through gears 33 in mesh with pinion 38, sleeve 24 and gear 39. Gear 39 is in mesh with pinions 40 and pinions 40 in mesh with interior gear 42, pinions 40 mounted on journals 41 and carried by drum 23. The diameter of pinion 39 being less than that of the interior gear 42, will drive drum 23 in the same direction as that of the flywheel, but at a slower rate of speed, thus obtaining the intermediate speed.

It will be seen that the intermediate speeds make use of all the gears, and the high speed employs the disks 14.

The band around drum 13 serves as a brake only.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. The combination with a drive shaft and a driven shaft, of a sleeve on the drive shaft, a drum on the sleeve, a ring secured to the drum, a disk secured to the drive shaft, friction disks between the disk and drum, plungers carried by the ring, pivotally supported arms engaging the plungers to force the friction disks together, a sliding collar for operating said arms, a sleeve on the driven shaft secured to the ring whereby motion may be transmitted from either the disk or the drum to the driven shaft, three nested sleeves on the first-mentioned sleeve, drums on all of said sleeves, pinions carried by the flywheel, pinions on two of said last-mentioned sleeves and on said first-mentioned sleeve meshing with said pinions, a second pinion on the opposite end of one of said sleeves, pinions carried by one of said drums and meshing with internal gear of drum and gear on sleeve, and means for holding any of said drums against movement.

2. The combination with a drive shaft, and a driven shaft, of a flywheel on the drive shaft, journal pins on the flywheel, three pinions secured together and of different diameters on each journal pin, sleeves having gears thereon meshing with the pinions, drums on the sleeves, means for transmitting motion directly from the drive shaft to the driven shaft, means for transmitting motion from any of said sleeves to the driven shaft, and means for holding any of said drums whereby the said sleeves are selected as driving elements.

3. The combination with a drive shaft, and a driven shaft, of a flywheel on the drive shaft, journal pins on the flywheel, three pinions secured together and of different diameters on each journal pin, sleeves having gears thereon meshing with the pinions, drums on the sleeves, means for transmitting motion directly from the drive shaft to the driven shaft, means for transmitting motion from any of said sleeves to the driven shaft, means for holding any of said drums whereby the said sleeves are selected as driving elements, and means compelling the release of said direct driving means when said drums are held.

4. The combination with a drive shaft, and a driven shaft, of a flywheel on the drive shaft, journal pins on the flywheel, three pinions secured together and of different diameters on each journal pin, sleeves having gears thereon meshing with the pinions, drums on the sleeves, means for transmitting motion directly from the drive shaft to the driven shaft, means for transmitting motion from any of said sleeves to the driven shaft, means for holding any of said drums whereby the said sleeves are selected as driving elements, and elastic means normally maintaining the drum holding means out of operation.

SMITH V. DICKMAN.